Dec. 11, 1956  H. GEHRE  2,773,384
GAS FLOW MEASURING EQUIPMENT
Filed Oct. 30, 1950  3 Sheets-Sheet 1
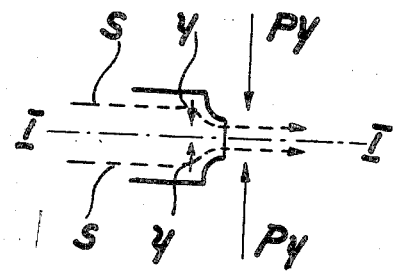
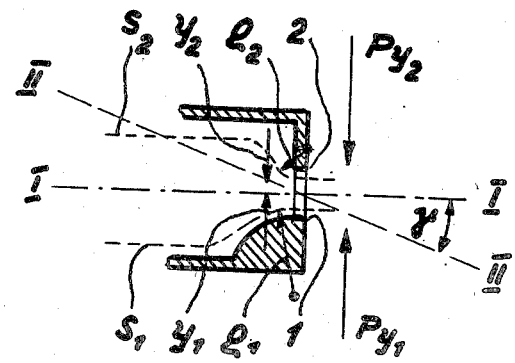
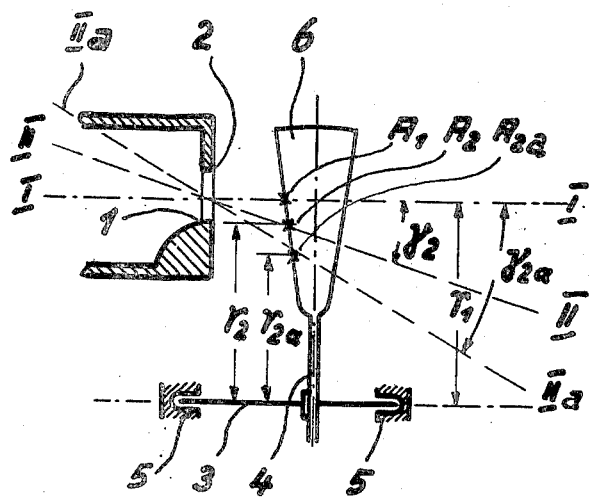
Inventor
Hans Gehre
by Sommers & Young
Attorneys Dec. 11, 1956  H. GEHRE  2,773,384
GAS FLOW MEASURING EQUIPMENT
Filed Oct. 30, 1950  3 Sheets-Sheet 3
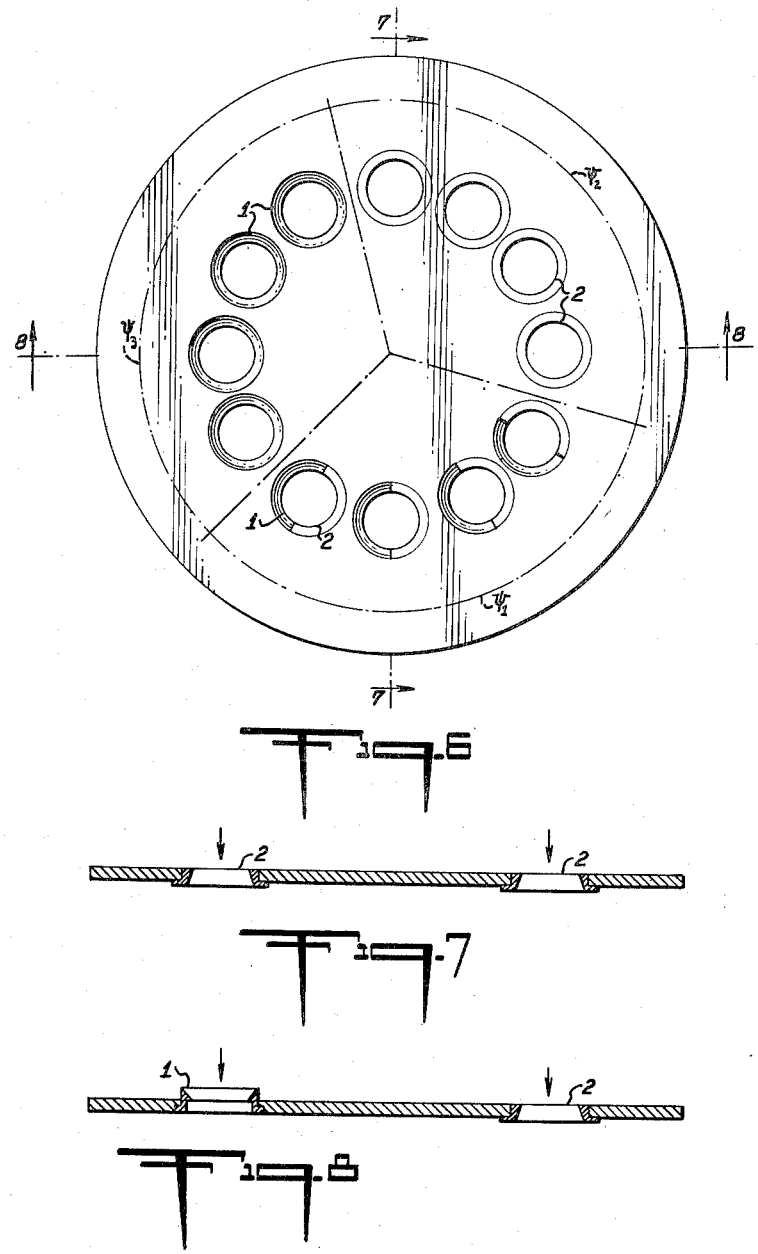

United States Patent Office 2,773,384
Patented Dec. 11, 1956

2,773,384
GAS FLOW MEASURING EQUIPMENT

Hans Gehre, Oberkassel (Rhine), Siegkreis, Germany

Application October 30, 1950, Serial No. 192,995
In Germany August 15, 1949

Public Law 619, August 23, 1954
Patent expires August 15, 1969

9 Claims. (Cl. 73—230)

The present invention relates to throttle devices for rotary meters for determining quantities of liquid and gases which are flowing through pipe lines by measuring the speed of flow and relates particularly to throttle devices which are formed of a plurality of openings or parts with contrasting flow characteristics.

In this connection it has already been proposed in my Swiss Patent No. 236,413 of June 16, 1945, to make use of different kinds of openings which are readily distinguished externally by their profile (nozzle type on the one hand and diaphragm type on the other hand) by connecting them in parallel and in such a ratio which can be graphically determined that the resulting flow coefficient $\alpha$ of the throttle device is approximately constant for all Reynolds values down to the lowest measuring limit of the apparatus. Thereby the measuring is freed from the disturbing influences which normally result from the cooperation of the dynamic and frictional forces on the one hand and the geometrical form of the throttle opening on the other hand to the extent that even with a considerable accumulation of dirt on the measuring instrument only a small parallel shift of the $\alpha$ line results. But for the certifying of meter devices for which it is required to be able to reproduce permanently the error characteristic, even this small shift is unsatisfactory and needs to be overcome.

It is also known that rotary meters exhibit the undesirable feature that the relation between rate of flow and speed of rotation of the meter wheel shaft varies considerably with decrease in the rate of flow. The error which is negative in character increases faster and faster with reduced speed of rotation so that the error curve approximates to a rectangular hyperbola. For liquid meters of this kind the limit of proportionality is about 2% of the nominal full load; for gas meters on account of the narrow limits of loss of pressure, it is about 25 to 20% of the nominal full load.

It is therefore desirable, particularly in the case of measurements of gas volume with measuring wheels (Woltman meter, worm meter, etc.), to improve the error curve by the simplest and most reliable means which neither need external sources of energy nor are sensitive to dust, nor require accurate mounting involving the use of a level.

The arrangement and devices already known for improving the error curve break down on this requirement. If however as in prior proposals, in front of the meter wheel a section of throttle is provided which combines parts or part openings which are connected in parallel and some of which have nozzle properties while others have diaphragm properties, there is the possibility of fulfilling these requirements in a most complete manner and also at the same time preventing the shift by dirt mentioned above of the $\alpha$ line which remains constant over the whole measuring range.

This is effected according to the present invention in a simple manner in that the cross section of the throttle adjacent to the meter wheel (whether it be a ring opening or a circle of individual openings) is defined as regards one portion by cooperating profiles with contrasting influence on the discharge coefficient, while the remainder consists of parts which are individually of one character only, but which have contrasting discharge characteristics.

The invention is based on exhaustive experiments whereby throttle devices which are assembled out of parts or part openings operating in parallel as regards flow but with contrasting discharge characteristics, if associated with a meter wheel (for example in a paddle wheel; worm- or Woltman-meter) with certain hypotheses operate in a further surprising manner to produce an improvement in the accuracy of this meter.

This method of working and its hypotheses will be more fully explained in connection with the drawing. In all the figures the same or corresponding parts are indicated by the same reference numerals.

Fig. 1 shows in schematic form a measuring opening with a consistent form of shape, in this case of the nozzle type. Naturally it would be equally possible to consider instead a consistent diaphragm type measuring opening.

Fig. 2 shows in similar manner an example of the known nozzle diaphragm combination previously proposed with parts connected in parallel as regards flow in which the shape of one and the same opening is partly a nozzle profile and partly a diaphragm profile and the two types of profile cooperate with one another.

Fig. 3 schematically shows a deflection of flow obtained from the arrangement according to the invention and its use in connection with a meter wheel.

Figure 4:
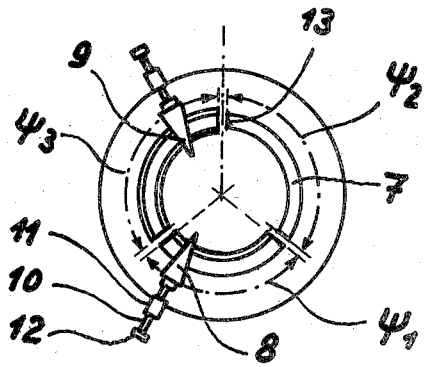

Fig. 4 schematically shows one embodiment of the invention, the throttle arrangement forming a ring gap.

Figure 5:
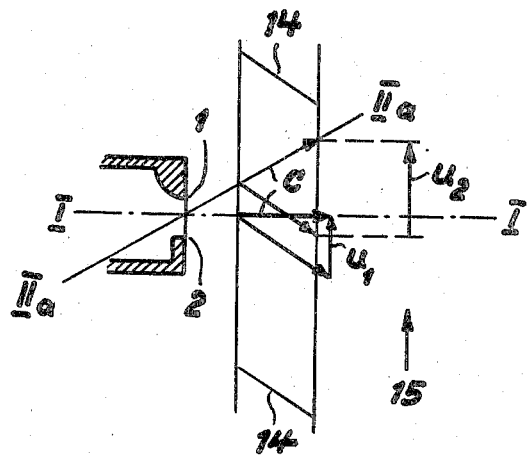

Fig. 5 schematically shows a deflection of the stream shown in Fig. 3, through a 90° rotation.

Fig. 6 is a plan view of another embodiment of the invention showing a ring of individual circular openings, and Figs. 7 and 8 are vertical, longitudinal sections of the embodiment of Fig. 6 in the plane of the measuring wheel shaft.

For the sake of simplicity it will first be assumed that both Figures 1 and 2 indicate an opening with a circular section. Naturally they could also (since they are shown in section) indicate ring-shaped openings of corresponding type. The circumstances in the two cases are completely analogous.

If a substance to be measured flows through a throttle opening with consistent profile (Fig. 1), forces Py are generated in the direction y normal to the direction of flow as indicated by the arrows. In view of the symmetry of the conditions, their resultant is zero and flow takes place from the opening in the direction of the axis I—I.

This balance of forces does not subsist however with the combination throttle in accordance with the prior proposal, since the shape of one and the same opening is made up of two associated but geometrically different profiles as in the case shown in Fig. 2 where part 1 is a nozzle profile and the corresponding part 2 is a diaphragm profile.

In this case the transverse forces $Py2$ on the diaphragm portion 2 are greater than the corresponding forces $Py1$ on the nozzle portion 1, because, in the latter case the radius of curvature $g2$ of the stream line $s2$ is smaller than the radius of curvature $g1$ of the stream line $s1$ at the nozzle 1. Accordingly there is a resultant transverse force in the direction $y2$, and flow takes place no longer in the direction of the axis I—I, but in the direction II—II inclined thereto at an angle $\gamma$.

Now it is known that in the range of Reynolds numbers below the so-called tolerance limits, the discharge coefficient α increases for diaphragms and decreases for nozzles and since the discharge cross section of the throttle opening according to Fig. 2 is formed on the one side with a diaphragm profile and on the other side with a nozzle profile, it may easily be seen that with falling Reynolds numbers an increasingly large part of the total flow will pass through the part controlled by the diaphragm side and an increasingly small part of the total will flow through the portion controlled by the nozzle side.

Since further the accelerations of the particles moving in the individual stream lines in the direction $y2$ transverse to the flow in the portion controlled by the diaphragm side are already greater than the corresponding accelerations in the direction $y1$ in the part controlled by the nozzle side, with decreasing Reynolds numbers the transverse force $Py2$ will become greater and the transverse force $Py1$ will become smaller. In other words the angle of deflection $\gamma$ relative to the axis I—I will become greater with decreasing Reynolds numbers and vice versa. The accuracy and reproducibility of this relation can be proved experimentally.

The hypotheses for the indicated deflection are therefore given precisely in the range of Reynolds numbers lying below the tolerance limits in which on account of the small pressure range which can be used mostly come in question in gas measuring with meter wheels.

Fig. 3 indicates how this deflection can be usefully employed in connection with a meter wheel. The shaft 3 of the meter wheel 4 is journalled at 5. The vanes 6 are located a suitable distance from the discharge orifices of a circle of throttle openings of which each is composed of two cooperating parts arranged to operate in parallel as regards flow, but with contrasting discharge characteristics. The arrangement is such that for each of the openings part 2 with a diaphragm shape is at a greater distance from the meter wheel shaft than part 1 with a nozzle shape.

With an ordinary measuring opening with a consistent nozzle or diaphragm profile, the discharge of the material to be measured for all Reynolds numbers whether large or small would always be in the direction of the axis I—I and the particles flowing in the plane of this axis would engage the leading edge of the vanes 6 at the point $A1$.

With the combined measuring opening in accordance with Fig. 3 however, this is only the case for quite large Reynolds numbers. For in this case in the lower part of the measuring range with decreasing Reynolds numbers, the deflection of the stream becomes increasingly effective. Thus for instance the discharge direction II—II corresponds to the angle of deflection $\gamma2$ and IIa—IIa corresponds to the angle of deflection $\gamma2a$ and the particles in the stream moving in these directions engage the leading edges of the vanes 6 at the point $A2$ and $A2a$. Thus as regards the meter wheel 4 there is a speed increase corresponding to $$\frac{r2}{r1}\cos\gamma2 \text{ or } \frac{r2a}{r1}\cos\gamma2a$$

where $r1$, $r2$ and $r2a$ are the distance of the points $A1$, $A2$ and $A2a$ from the meter wheel shaft.

In this ratio therefore, compared with an ordinary meter in which the flow from the throttle opening always takes place in the direction I—I, the indications of the meter are increased, that is to say the negative error is reduced. These conditions remain the same if instead of a circle of individual openings with cooperating nozzle form and diaphragm form portions, a continuous or sub-divided ring throttle is employed, one edge of which has a nozzle profile while the other has a diaphragm profile.

If Fig. 3 is regarded as an illustration of this embodiment, it will readily be seen that the outer portion must have a diaphragm profile and the inner portion a nozzle profile. If now the whole cross section of the throttle (whether this comprises the form of a ring or a circle of individual openings) is defined by two cooperating profiles with a contrasting influence on the discharge characteristic, the whole mass of the discharge will be deflected as shown and will exert an accelerating impulse on the meter wheel. This total impulse will produce much too great an increase in the speed of rotation of the meter wheel 4 and hence produce over-compensation of the meter error by moving it into the positive range.

In order to prevent this, according to the invention, only a part of the total cross section of flow of the throttle device is employed for generating a deflection so that only a portion of the total flow can operate in an accelerating sense on the meter wheel. The size of this part should be determined by experiment so as to bring the error curve of the meter within the tolerance limits (raising of the error curve in the lower part of the measuring range). In order now further to prevent the shift of the thus corrected error curve when dirty conditions have developed, the remainder of the total throttle cross section is divided into consistently nozzle openings and consistently diaphragm openings, in such proportions that the contrasting alterations of the α values of the two kinds of openings virtually compensate for the dirty conditions. This relation also must be determined experimentally. It will differ slightly from that obtained by disregarding gradual soiling.

One embodiment of the invention is shown schematically in Fig. 4. The throttle arrangement here forms a ring gap 7 of which only the portion forming the sector $\varphi1$ is formed of two profiles which operate in parallel with contrasting influence on the α characteristic. The remainder $360° - \varphi1$ of the ring gap 7 consists of two portions, the sectors $\varphi2$ and $\varphi3$, of which each involves a consistent profile, the one with a nozzle character and the other with a diaphragm character. From the sector $\varphi1$ of the ring gap 7, the stream of material to be measured is deflected, but from the sectors $\varphi2$ and $\varphi3$ it is undeflected.

It may happen in practice that subsequent regulation is necessary compared with the proportions determined by experiment. In order to facilitate this, radial adjustable tongues are provided in the example shown, a tongue 8 within sector $\varphi1$ and a second tongue 9 for the remainder $360° - \varphi1$ of the ring gap 7. The tongue 8 serves to adjust the acceleration of the meter wheel, the tongue 9 on the other hand has the function of reestablishing the original size of the total cross section after an adjustment of the tongue 8. In this manner the portion of deflected to undeflected flow can be adjusted as necessary.

The setting of the tongues is effected by hand, for instance by rotation of the screw spindles 10 which are mounted in nuts 11 and at their free ends are provided with adjusting knob or the like 12. The sectors $\varphi1$, $\varphi2$ and $\varphi3$ can be separated by thin partitions 13.

The invention is not limited to the arrangement shown and described, for instance instead of a single tongue 9 for the remaining arc $360° - \psi1$ of the gap, a separate regulating tongue can be provided for each of the two partial sectors $\psi2$ and $\psi3$ and instead of the single larger sector $\psi1$, this may be divided into a plurality of smaller sectors, preferably symmetrically disposed over the total cross section. It is also not absolutely necessary that all the sectors of the ring gap for the individual opening of the circle shall be located at the same distance from the meter wheel shaft. These distances can be chosen of various lengths.

With a ring-shaped throttle cross-section however, it will be clear from what has been said above that within the limits of this sector $\psi1$, the diaphragm type portion of the ring gap must be at the greater distance from the meter wheel shaft and the nozzle type at the smaller distance. On the other hand with throttle devices which comprise a circle of individual openings, the direction of deflection of the stream can be varied by axial rotation of the opening with variable profile which is used for compensation of the negative error.

Figs. 6, 7, and 8 show the embodiment of the invention in which a ring of individual circular openings is employed. Referring to Fig. 6, in the sector marked "ψ3" the throttle openings have a nozzle profile; in the sector marked "ψ2," the throttle openings have a diaphragm profile, in the sector marked ψ1," the throttle openings have a profile made up of nozzles and diaphragms lying opposite each other. The embodiment shown in Fig. 6 operates in substantially the same manner as that set forth in Fig. 4 with respect to the deflection of flow through the various openings.

The nozzles and diaphragms of Fig. 6 are inserted in the corresponding borings of the orifice plate, and at least the combined openings of sector "ψ1," i. e., the nozzles and diaphragms lying opposite each other, may be twisted by hand, that is to say, by the use of a suitable twisting tool, and thus may be so adjusted as the individual case requires in accordance with the adjustments set forth in the ensuing description.

Figs. 7 and 8 each show a vertical longitudinal section in the plane on the measuring wheel shaft of the device depicted in Fig. 6.

Consequently for instance by a rotation of 90° from the position shown in Fig. 3, in opposition to the direction of rotation of the meter wheel, an embodiment is produced in which the centres of gravity of the two partial profiles lie on opposite sides of a plane through the meter wheel shaft, so that in the direction of rotation of the meter wheel the nozzle profile always follows the diaphragm profile.

In consequence of this the direction of the deflection of the stream is turned through 90° against the direction of rotation of the meter wheel and the stream of material to be measured is no longer deflected towards the measuring wheel shaft, but in the direction of rotation of the meter wheel, and therefore always engages the leading edges of the vanes 6 in the same position corresponding to the radius r1 in Fig. 3 from the meter wheel shaft.

Such a position is shown schematically in Fig. 5. By means of appropriate twisting the throttle opening is so arranged that the centre of gravity of the two cooperating but geometrically different profiles lie on opposite sides of a plane through the meter wheel shaft and when the meter wheel is rotating during operation, the vanes always encounter first the diaphragm side control portion and then the nozzle side control portion of the opening. The parallelogram 14 represents the development of the portion of the vane adjacent to the throttle opening. The direction of movement is indicated by the arrow 15 and it is assumed that the engagement of the paddles by the stream of material to be measured takes place in the neighbourhood of the circumference of the meter wheel.

The twisting of the nozzle whereby the throttle opening may be arranged to a desired value is first effected prior to operation. This is preferably done in gauging and testing the meter prior to its being sealed. If necessary as a correction for the error curve of the meter, a further twisting may be effected during operation of the meter. This further adjustment during operation could be effected, for example, by providing means and twisting from outside of the meter housing while the meter is in operation without the necessity of stopping the meter.

The velocity diagram indicated in the figure above that a stream which is discharged from the opening in the direction I—I with velocity C imparts to the member 14 and hence to the meter wheel a circumferential velocity $u1$, and that an ejected stream moving in the direction IIa—IIa with the same velocity C would impart a greater circumferential velocity $u2$. The rate of rotation of the meter wheel is therefore increased by the deflection of the stream in the ratio $$\frac{u2}{u1}$$

Naturally it is possible to choose any position of the throttle opening lying between the limits 90° apart in order to compensate for the negative error. In each case the number of openings which must be associated with the meter wheel in this manner can easily be determined by experiment. The form and arrangement of the regulating tongues can easily be suited to the circumstances then existing.

I claim:

1. In an axial flow measuring wheel meter for measuring volumes of fluids by flow velocity measurement, a measuring wheel mounted for rotation about an axis extending in the direction of flow, an orifice plate positioned substantially normal to the flow axis of the meter having a plurality of apertures arranged circularly about said axis, and collectively defining a throttle opening for directing fluid passing therethrough to impinge on said measuring wheel, said apertures being divided into a first section, a second section, and a third section, each of said sections consisting of at least one aperture, the aperture of said first section having two opposing profiles with contrasting flow characteristics, the aperture of said second section having two opposed profiles with flow characteristics similar to each other, the aperture of said third section having two opposing profiles with flow characteristics similar to each other, but contrasting to the flow characteristics of said second section.

2. Improvement according to claim 1, in which the aperture of said first section is defined by a diaphragm type profile and opposed nozzle type profile, said diaphragm type profile being positioned at a greater distance from the measuring wheel shaft of such a meter than said nozzle type profile.

3. Improvement according to claim 2, in which the aperture of said second section is defined by opposing nozzle type profiles, and in which the aperture of said third section is defined by opposing diaphragm type profiles.

4. Improvement according to claim 1, in which the aperture of at least said first section is in the form of at least one circular opening defined by a nozzle type profile and an opposed diaphragm type profile, said profiles being positioned on opposite sides of a plane passing through the measuring wheel shaft of such a meter with the nozzle type profile following the diaphragm type profile in the direction of rotation of the measuring wheel.

5. Improvement according to claim 1, in which said throttle opening is defined as an annular opening, said first, second, and third sections being separated from each other by partition means.

6. Improvement according to claim 1, including means for variably adjusting the relative values of the cross-sectional openings of said sections.

7. Improvement according to claim 6, in which said means for variably adjusting the relative value of the cross-sectional openings of said sections includes an adjustable tongue positioned in the cross-sectional opening of at least one of said sections.

8. Improvement according to claim 1, in which said throttle opening is defined by a ring of individual circular openings.

9. Improvement according to claim 8, in which the circular openings of said first section are each defined by nozzle-type profiles and opposed diaphragm-type profiles, said profiles being positioned on opposite sides of a plane passing through the measuring wheel shaft of the meter with the nozzle-type profiles following the diaphragm-type profiles in the direction of rotation of the measuring wheel.

(References on following page)

References Cited in the file of this patent

UNITED STATES PATENTS

| | | |
|---|---|---|
| 227,576 | Read | May 11, 1880 |
| 404,374 | Ball | June 4, 1889 |
| 864,579 | Volz | Aug. 27, 1907 |
| 948,755 | Bangerter | Feb. 8, 1910 |

FOREIGN PATENTS

| | | |
|---|---|---|
| 30,377 | Great Britain | 1910 |